(12) United States Patent
Young et al.

(10) Patent No.: US 6,362,377 B1
(45) Date of Patent: Mar. 26, 2002

(54) WAXES

(75) Inventors: Desmond Austin Young, Vanderbijlpark; Michelle Grant, Vaalpark; Stefanus Johannes Strydom, Umhlanga Rocks; Jacobus Lucas Visagie, Sasolburg; Christiaan Frederick Reinecke, Vaalpark; Nicolaas Russouw Louw, Vanderbijlpark, all of (ZA)

(73) Assignee: Schumann-Sasol (Proprietary) Limited, Johannesburg (ZA)

( * ) Notice: Subject to any disclaimer, the term of this patent is extended or adjusted under 35 U.S.C. 154(b) by 0 days.

(21) Appl. No.: 09/525,293

(22) Filed: Mar. 14, 2000

Related U.S. Application Data

(63) Continuation of application No. PCT/IB99/01280, filed on Jul. 12, 1999.

(30) Foreign Application Priority Data

Jul. 30, 1998 (ZA) .............................................. 98/6821

(51) Int. Cl.$^7$ ........................... C07C 41/00; C07C 29/12
(52) U.S. Cl. ........................ 568/579; 568/886; 585/946
(58) Field of Search ................................ 568/579, 886; 535/946

(56) References Cited

U.S. PATENT DOCUMENTS

| 3,437,623 A | 4/1969 | Heintzelman .............. 260/28.5 |
| 3,563,910 A | 2/1971 | Fishman ..................... 252/498 |
| 4,908,063 A | 3/1990 | Baker et al. .................. 106/31 |

FOREIGN PATENT DOCUMENTS

| DE | 3106866 | 2/1982 |
| EP | 0329891 | 8/1989 |
| EP | 0451352 | 10/1991 |
| FR | 1432974 | 2/1966 |
| JP | 6023759 | 2/1994 |
| WO | 9005711 | 5/1990 |
| WO | 9413709 | 6/1994 |

*Primary Examiner*—Johann Richter
*Assistant Examiner*—J. Parsa
(74) *Attorney, Agent, or Firm*—Ladas & Parry

(57) ABSTRACT

A process for modifying a wax comprising treating a wax to introduce a hydroxyl functionality, said treating being selected from the group consisting of grafting with an allyl alcohol, oxidizing the wax and hydrogenating the oxidized wax, reacting the wax with a peroxide and mixtures thereof, so as to form primary and/or secondary hydroxyl groups thereon, thereby to obtain a hydroxyl wax; and subjecting at least some of the hydroxyl groups of hydroxyl wax to alkoxylation to form a modified wax.

18 Claims, 2 Drawing Sheets

WAXES

This application is a continuation of PCT/IB99/01280 filed on Jul. 12, 1999.

THIS INVENTION relates to waxes. It relates in particular to a process for modifying a wax.

According to the invention, there is provided a process for modifying a wax, which process comprises in a treatment step, treating a wax to form primary and/or secondary hydroxyl groups thereon, thereby to obtain a hydroxyl wax; and in an alkoxylation step, subjecting at least some of the hydroxyl groups of hydroxyl wax to alkoxylation, thereby to form a modified wax.

A wax is a linear saturated hydrocarbon having a $C_{20}$ to $C_{100}$ carbon number distribution. While the invention can, at least in principle, have application to any wax, eg a polyethylene wax, it is believed that the invention will have particular application to Fischer-Tropsch derived waxes.

By 'Fischer-Tropsch derived waxes' is meant waxes obtained by reacting a synthesis gas comprising carbon monoxide and hydrogen in a specific ratio, over a cobalt, iron, or cobalt/iron Fischer-Tropsch catalyst, at a temperature between 200° C. and 240° C., typically about 240° C., in a fixed or slurry bed reactor, thereby to produce a product range of mainly $C_{21}$–$C_{85}$ paraffinic hydrocarbons; and fractionating these hydrocarbons into soft, medium and hard wax fractions, with one of these fractions then being used as the feedstock for the process of the invention. The fractionation may typically be by way of Short Path Distillation, using a temperature between 150° C. and 400° C. at a pressure between 2,0 mbar and 0,02 mbar, more preferably, a temperature between 200° C. and 350° C. at a pressure between 1,5 mbar and 0,07 mbar is used.

A wax having a carbon number distribution of $C_{20}$ to $C_{32}$, eg ave $C_{24}$, is typically deemed to be a soft wax; a wax having a carbon number distribution of $C_{20}$ to $C_{42}$, eg ave $C_{30}$, is typically deemed to be a medium wax; and a wax having a carbon number distribution of $C_{29}$ to $C_{85}$ is typically deemed to be a hard wax. The hard wax can in turn be fractionated into a light fraction typically having a carbon number distribution of $C_{29}$ to $C_{55}$, eg ave $C_{40}$, and a heavy fraction, typically having a carbon number distribution of $C_{45}$ to $C_{85}$, eg ave $C_{75}$.

The modified wax obtained from the process is suitable for use as a wax emulsifier and/or is a self-emulsifiable wax.

In a first embodiment of the invention, the treatment of the wax to form the hydroxyl wax, may comprise grafting the wax with allyl alcohol ($CH_2CHCH_2OH$). The wax may then, in particular, be the heavy fraction of a Fischer-Tropsch derived hard wax. The hydroxyl wax then comprises a wax with side chains carrying a propanol group, ie $RCH_2CH(CH_2CH_2CH_2OH)CH_2R$ where $R=C_{40}$ to $C_{80}$.

The ratio or proportion of allyl alcohol to wax may be between 0,0330 and 0,0730 g allyl alcohol/gram of wax, preferably between 0,0360 and 0,0640 g/g wax, to produce a hydroxyl wax having a hydroxyl value in the range 30 to 75 mg KOH/g.

The grafting of the wax with the allyl alcohol may be effected in the presence of a radical initiator, such as a peroxide.

This hydroxyl wax may then be reacted, in the alkoxylation step, with differing amounts or an alkoxide, typically ethylene oxide, to obtain the modified waxes, which are thus polyethoxy modified waxes when ethylene oxide is used as the alkoxide. These modified waxes typically have a HLB (hydrophilic-lipophilic balance) value between 2 and 18, and can be used as self-emulsifiable waxes, or can be used as emulsifiers for modified, ie oxidized, or unmodified Fischer-Tropsch derived hard waxes.

An emulsion comprises either a mixture of a self emulsifiable wax and water, or a mixture of an emulsifier, with a wax, such as a Fischer-Tropsch derived wax. All emulsifiers comprise a molecule comprising both hydrophilic and lipophilic groups. The HLB thus express the balance of the size and strength of the hydrophilic and lipophilic groups of an emulsifier.

HLB can also be expressed as the amount of alkoxide polymerization observed in the modified wax. Stable pressure emulsions can typically comprise a mixture of the polymer derivative and wax, typically 5% of the polyethoxy modified wax as emulsifier, can be blended with 20% of a Fischer-Tropsch wax, with the balance being water.

In a second embodiment of the invention, the wax may be an oxidized wax, such as an uncatalysed auto-oxidized, ie air oxidized, Fischer-Tropsch derived hard wax or a component thereof eg the light or heavy fraction of the Fischer-Tropsch derived hard wax. The process may include, if desired, forming the oxidized wax eg by reacting the unoxidised wax and air in a suitable reactor, eg in a batch reactor.

The auto-oxidized wax will thus have oxygen-containing primary and secondary functional groups such as ketone, ester and carboxylic acid functional groups. The treatment of the oxidized wax may then include hydrogenating the oxidized wax to form the hydroxyl wax.

It was surprisingly found that the hydrogenation of the oxidized wax could be effected by means of hydrogen in the presence of a catalyst, such as a CuCr and/or a Ru/C catalyst, optionally in the presence of methanol as esterification/trans-esterification agent, and at elevated temperature and pressure. The temperature may be in the range 100° C. to 300° C., with the pressure ranging from 50 bar to 300 bar. Typically, the hydrogenation may be effected in a plug flow reactor.

Alternatively, prior to the hydrogenation of the oxidized wax, the oxidized wax may be esterified with methanol in the presence of a small amount of p-toluene sulphonic acid as catalyst to catalyze the reaction. The esterification may then be effected at a temperature in the range 100° C. to 200° C., and at a pressure in the range 0,5 to 3 bar.

This hydroxyl wax may have a hydroxyl value in the range of 30 to 150 mg KOH/g, and may have primary and secondary hydroxyl groups, with the hydroxyl value being dependent on the oxidation value of the starting material and also on the hydrogenation conditions.

In the alkoxylation step, the resulting secondary and primary hydroxyl groups on the hydroxyl wax may then be alkoxylated, eg ethoxylated, to produce a self-emulsifiable wax product or a wax emulsifier, depending on the hydroxyl value of the hydroxyl wax. Typically when 50 (mol) % to 70 (mol) % hydroxyl groups are present, a self-emulsifiable wax is obtained, and typically with hydroxyl groups from 90 (mol) % to 140 (mol) % an emulsifier is obtained.

The oxidation level of the wax and the hydrogenation conditions have a direct effect on the hydroxyl value of the resulting hydroxyl wax. This in turn has an influence on the product after reaction with the alkoxide, eg ethylene oxide. The properties of the ethylene oxide derived products range from self-emulsifiable waxes to that of an emulsifier allowing a range of 20 to 60% of unfunctionalized wax to be added to still form stable emulsions.

The ethoxylation may typically be effected in a batch reactor, in the presence of a catalyst such as sodium ethoxide, at a temperature between 100° C. and 200° C., and at a pressure between 3 bar and 6 bar.

In a third embodiment of the invention, the treatment of the wax to form the hydroxyl wax, may comprise reacting the wax with a peroxide, typically hydrogen peroxide, eg in a nitrogen/air inert atmosphere, to form the hydroxyl wax. The hydroxyl wax can then be alkoxylated, eg ethoxylated, to produce a wax emulsifier and/or a self-emulsifiable wax. The wax may, in this embodiment, be a Fischer-Tropsch derived hard wax, or a light or heavy fraction thereof.

The reaction with the hydrogen peroxide may be effected (i) at a temperature between 100° C. and 300° C., more preferably between 160° C. and 175° C.; and (ii) for a period between 15 and 200 minutes, more preferably for between 45 and 130 minutes, with the reaction time depending on the reaction temperature. This results in a hydroxyl wax with a hydroxyl value of between 15 and 40 mg KOH/g. The hydroxyl Fischer-Tropsch wax can be directly ethoxylated to form the same range of products and emulsions as hereinbefore set out.

Prior to ethoxylation, the hydroxyl wax may first be subjected to propylene oxide treatment, if desired.

The invention extends to a modified wax when produced by the process of the invention, as well as to a hydroxyl wax obtained from the treatment step of the process of the invention.

Hydroxyl waxes thus obtained can also be used as an end product, eg to prepare amino-amide waxes, as a textile finishing agent, as lubricants in coatings, or as lubricating coating for metals and hot-melt adhesives.

It has also surprisingly been found that the long chain, ethoxylated, heavy and light fractions of the hard wax, of the Fischer-Tropsch derived hard waxes, can find applications as emulsifiers or self-emulsifiable waxes in the textile industry, in water-based inks and in the formulation of various polishes and lubricants.

The invention will now be described in more detail with reference to the accompanying drawings and the subsequent non-limiting examples.

BRIEF DESCRIPTION OF THE DRAWINGS

Referring to FIG. 1, reference numeral 10 generally indicates a process for modifying a wax, according to a first embodiment of the invention.

Figure 1:
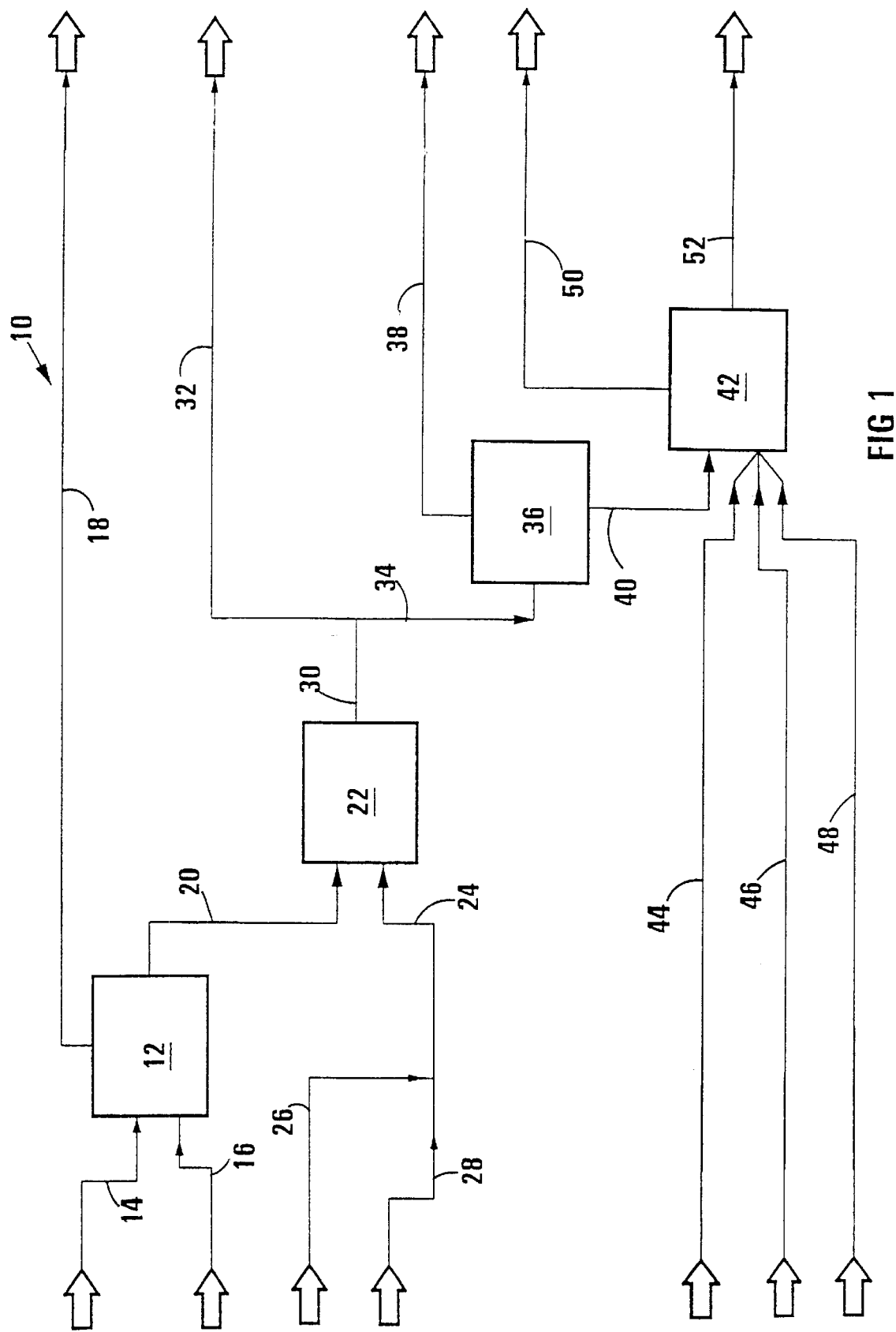
FIG. 1 shows a simplified flow diagram of a process for modifying a wax, according to a first embodiment of the invention.

The process 10 comprises an oxidation batch reactor, generally indicated by reference numeral 12. An air line 14 as well as a wax feed line 16 lead into the reactor 12.

An excess or spent air withdrawal line 18 leads from the reactor 12, as does an oxidized wax line 20.

The line 20 leads to a hydrogenation plug flow reactor, generally indicated by reference numeral 22. A hydrogen/methanol feed line 24 leads into the reactor 22, with a methanol make-up line 26 as well as a hydrogen makeup line 28 leading-into the line 24.

A product withdrawal line 30 leads from the reactor, with the line 30 splitting into a hydrogen withdrawal line 32 and a hydroxyl wax/methanol/water line 34.

The line 34 leads into a distillation column 36.

A methanol/water withdrawal line 38 leads from the top of the distillation column 36, while a bottoms line 40 leads from the column 36 to an ethoxylation batch reactor 42.

A catalyst feed line 44 leads into the reactor 42 as do a nitrogen make-up line 46 and an ethylene oxide make-up line 48. A nitrogen withdrawal line 50 leads from the reactor 42, as does a modified wax withdrawal line 52.

In use, air and a Fischer-Tropsch derived wax, typically a Fischer-Tropsch derived hard wax a hereinbefore defined, are fed into the reactor 12 along the lines 14, 16, respectively, and reacted to produce oxidized wax which is withdrawn along the flow line 20. Excess air is withdrawn along the flow line 18.

In the hydrogenation reactor 22, the oxidized wax is, in a treatment step, reacted with hydrogen and methanol at 200° C. and 100 bar, over a CuCr and Ru/C catalyst, preferably at a hydrogen/wax ratio (mole basis) around 100% and using a 10% methanol excess (calculated from the acid value of the oxidized wax), to produce a hydroxyl wax. The hydroxyl wax, together with unreacted hydrogen, excess methanol and water are withdrawn along the line 30. Excess hydrogen is withdrawn along the line 32, while the remaining components pass along the flow line 34 to the distillation column 36.

In the distillation column 36 the methanol and water are withdrawn along the flow line 38 as an overheads product, while the bottoms product, comprising mainly hydroxyl wax, passes to the ethoxylation reactor 42.

In the reactor 42, the hydroxyl wax is subjected to ethoxylation by means of ethylene oxide entering along the flow line 48 in the presence of a catalyst comprising sodium ethoxide under a nitrogen atmosphere. Typical reaction conditions in the reactor 42 are a reaction temperature of 140° C. and a reaction pressure of 4 bar. Spent nitrogen is withdrawn along the flow line 50, while a modified wax, suitable for use as a self emulsifiable wax product or a wax emulsifier, is withdrawn along the flow line 52.

It will be appreciated that the reactor 12 can be dispensed with, eg if the wax is a auto-oxidised Fischer-Tropsch derived hard wax or a component thereof.

Figure 2:
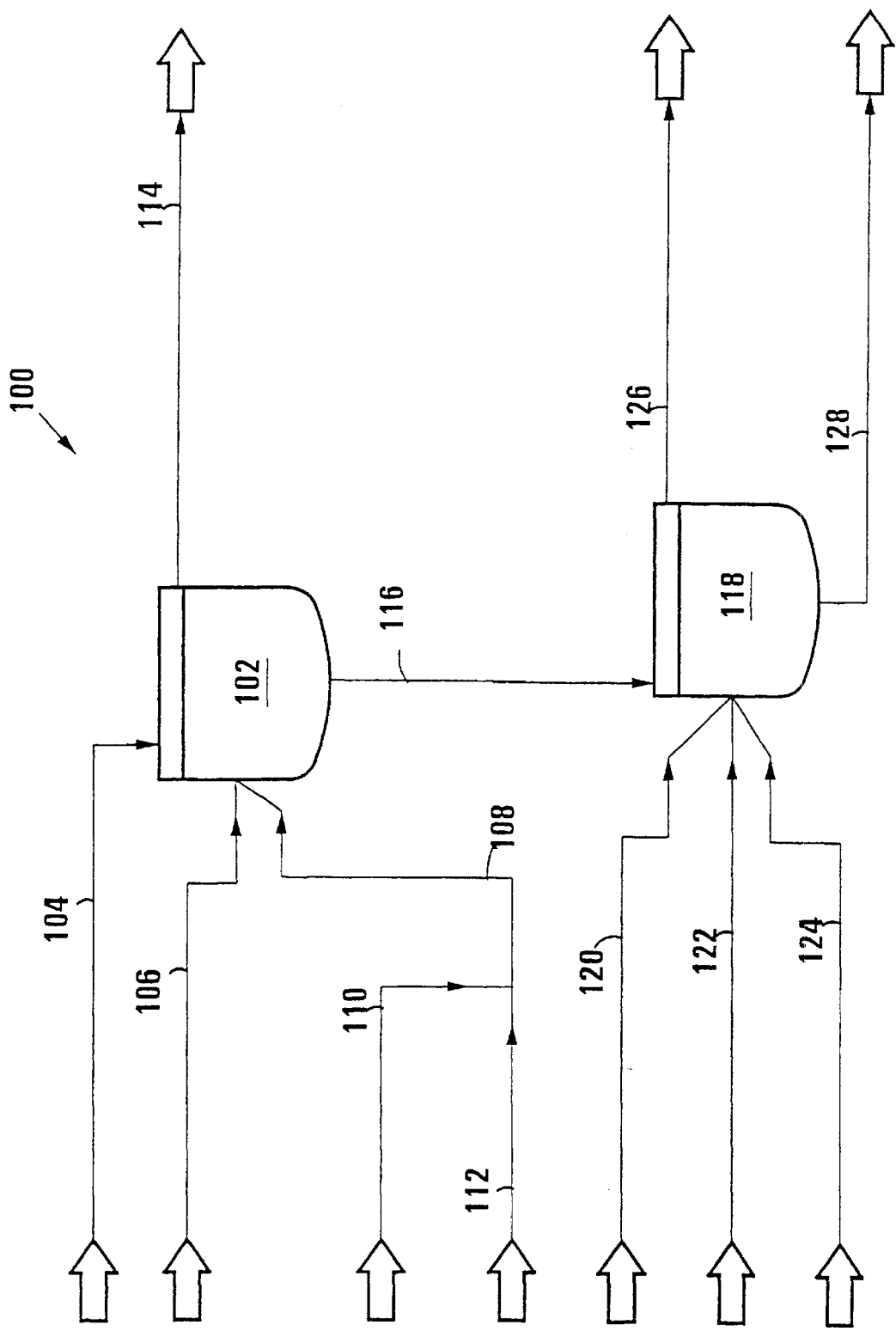
FIG. 2 shows a simplified flow diagram of a process for modifying a wax, according to a second embodiment of the invention.

Referring to FIG. 2, reference numeral 100 generally indicates a process for modifying a wax, according to a second embodiment of the invention.

The process 100 includes a grafting batch reactor 102, with a nitrogen line 104 leading into the reactor for use in providing a nitrogen blanket in the reactor. A paraffin wax feed line 106 leads into the reactor 102, as does an allyl alcohol/peroxide feed line 108. An allyl alcohol make-up line 110 as well as a peroxide make-up line 112 lead into the flow line 108. A spent allyl alcohol/nitrogen flow line 114 leads from the top of the reactor 102, while a grafted hydroxyl wax withdrawal line 116 leads from the bottom of the reactor 102.

The line 116 leads to an ethoxylation batch reactor 118. A nitrogen make-up line 120, a catalyst addition line 122, and an ethylene oxide addition line 124 lead into the reactor 118. A spent nitrogen withdrawal 126 leads from the top of the reactor, while a modified wax withdrawal line 128 leads from the bottom of the reactor 118.

In use, paraffin wax, which enters the reactor 102 along the flow line 106, is reacted with allyl alcohol and a peroxide, as a radical initiator, entering along the flow line 108 at a rate of 3 ml/min and an allyl alcohol: di(tert-butyl) peroxide molar ratio of 3:1. Spent allyl alcohol/nitrogen is withdrawn along the flow line 114, while the resultant hydroxyl wax is withdrawn along the line 116 to the reactor 118.

The reactor 118 functions in substantially the same fashion as the reactor 42 hereinbefore described with reference to FIG. 1.

EXAMPLE 1

300 g of Fischer-Tropsch hard wax was heated to 180° C. in a stirred autoclave. After proper purging of the autoclave with nitrogen the allyl alcohol (18, 82 g to give an hydroxyl value of 55 mg KOH/g at 90% conversion) and di(tert-butyl) peroxide (6,27 g where allyl alcohol/DTBP ratio is 3:1) mixture was added to the autoclave at 3 ml/min with stirring. The reaction mixture was left for 20 minutes (6,5 times the half-life time of DTBP) before releasing the pressure of the autoclave into a fume cupboard. The autoclave was purged with nitrogen before removing the product.

EXAMPLE 2

Commercial Fischer-Tropsch oxidized hard wax was hydrogenated using a copper chromite catalyst at 100 bar pressure and 200° C. in a continuous process. The hydrogen/wax ratio (mole basis) was in the region of 100%. The amount of methanol added was calculated from the acid value of the oxidized wax with an excess of 10%.

EXAMPLE 3

Commercial Fischer-Tropsch oxidized hard wax was hydrogenated in the presence of a ruthenium and copper chromite catalyst mixture at 100 bar and 200° C. in a continuous process. The hydrogen/wax ratio (mole basis) was in the region of 100.

EXAMPLE 4

Fischer-Tropsch oxidized hard wax was esterified with methanol in the presence of a small amount of p-toluene sulphonic acid (0,6 to 0,75 g/kg wax) to catalyze the reaction. The mol ratio of methanol to acid groups in the wax was approximately 3:1. The reaction was carried out batch-wise in a 5 l stirred autoclave at a-temperature of 150° C. and an initial pressure of 1,5 bar nitrogen. The reaction was terminated when the acids concentration had fallen to 2 mg KOH/g. The autoclave was depressurized and the wax removed. Hydrogeneration of the esterified wax was done in the same manner as in Example 2.

EXAMPLE 5

500 g of Fischer-Tropsch hard wax was heated to 170° C. in a 5-necked round bottom flask while stirring and 500 mg of a 50% hydrogen peroxide mixture was added by drops to the wax. The reaction mixture was stirred for an additional 10 minutes before removing the product. The functionalized wax had a hydroxyl value of 36 mg KOH/g.

EXAMPLE 6

The functionalized wax from Example 1 was reacted with ethylene oxide (50 wt % of reaction mixture) in a stirred autoclave at 130–140° C. and 3,5–4 bar in the presence of 2 wt % of sodium ethoxide based on the wax. After the addition of the ethylene oxide, the reaction mixture was stirred until no pressure drop was observed. The product had a HLB of 10.

EXAMPLE 7

The ethoxylated Fischer-Tropsch waxes with different HLB's, prepared according to the method in Example 6, find application in inks, textile finishes and polishes.

EXAMPLE 8

The wax prepared according to the method in Example 7 was emulsified to form a wax in water dispersion. (The word emulsion and dispersion are used interchangeably herein; however, if the hydroxyl wax is considered a solid then the term dispersion may be more appropriate). The wax is melted at a temperature of 135° C. and slowly added to water at 95° C. using medium- to high-shear agitation. While continuing the agitation, the mixture is cooled to room temperature. The composition of the dispersion comprises on a weight basis (a) from about 10%–60% of wax and (b) from about 40%–90% water.

EXAMPLE 9

The wax prepared according to the methods in Example 7 was emulsified to form a wax in water dispersion. The wax and water were added to a autoclave and heated to 135° C. with a pressure build-up of 400 pa. Medium to high shear agitation was used to mix the wax and water for 30 minutes keeping the temperature at 135° C. The emulsion was cooled down to room temperature to form a dispersion while the agitation was continued.

EXAMPLE 10

The dispersions prepared according to the methods in Example 8 and Example 9 were used in the form of a floor polish formulation and were applied to various substrates and allowed to dry to provide a clear tough finish that has improved properties. Applied to a floor surface, it provides scuff resistance, black heel mark protection and slip resistance. The floor polish contained additional materials as used in standard floor polishes such as coalescing aids, acrylic polymers, plasticizers, alkali soluble resins and other waxes.

EXAMPLE 11

The dispersions prepared according to the methods in Example 8 and Example 9 were used in the form of a water-based ink. A wax dispersion is included in water-based inks to enhance the gloss and coefficient of friction and to lower the rub resistance of the ink when printed on paper.

EXAMPLE 12

The dispersions prepared according to the methods in Example 8 and Example 9 were used in the form of a lubricant on textiles. The dispersion was diluted in water with a wax concentration from about 0,2% to about 10% and padded onto cotton and poly-cotton fabric. An improvement in abrasion resistance, tear strength and needle penetration force was experienced.

EXAMPLE 13

The wax was prepared according to the method in Example 7 and used as a wax emulsifier for unlimited examples of wax grades. The composition of the wax dispersion comprises on a weight basis:

(a) from about 2% to about 50% of the emulsifier (b) from about 2% to about 60% of the wax and (c) from about 40% to about 96% of water.

The methods used are the standard methods for preparing wax emulsions and dispersions.

Hitherto, the heavy fraction of hard wax ($C_{45}$ to $C_{85}$, ave $C_{75}$) has not been emulsifiable with any commercially available emulsifier, possibly because of the shorter chain length of the hydrophobic part of the existing commercial emulsifiers.

The chain length of the hydrophobic part of the commercially available emulsifiers ($C_{49}$ ave) more or less matches that of the light fraction of the hard Fischer-Tropsch wax ($C_{29}$ to $C_{55}$, ave $C_{40}$). However the hydrophobic chain length of the heavy fraction of the hard FT-wax ranges from $C_{45}$ to $C_{85}$ (ave $C_{74}$) which is much longer than the hydrophobic part of the commercially available emulsifiers. In the current invention the hydrophobic part of the emulsifier matches that of the heavy fraction of the hard Fischer-Tropsch wax, as the starting material of this inventions emulsifier is an oxidized heavy fraction of the hard wax and not a full range hard wax cut.

The uniqueness of this invention lies in the method of preparation and/or functionalization of the hydrophobic part of the hard wax emulsifier, which differs substantially from the prior art "know-how" of end functionalization of low molecular weight polymers of ethylene.

What is claimed is:

1. A process for modifying a wax comprising treating a wax to introduce a hydroxyl functionality, said treating being selected from the group consisting of grafting the wax with an allyl alcohol, oxidizing the wax and hydrogenating the oxidized wax, reacting the wax with a peroxide and mixtures thereof, so as to form primary and/or secondary hydroxyl groups thereon, thereby to obtain a hydroxyl wax; and subjecting at least some of the hydroxyl groups of the hydroxyl wax to alkoxylation thereby to form a modified wax.

2. A process according to claim 1, wherein the wax is a Fischer-Tropsch derived wax.

3. A process according to claim 2, wherein the grafting of the wax with the allyl alcohol is used to obtain the hydroxyl wax, with the wax being a heavy fraction of a Fischer-Trposch derived hard wax, and with the hydroxyl wax comprising a wax with side chains carrying a propanol group.

4. A process according to claim 3, wherein the alcohol to wax ratio is between 0.0330 and 0.0730 g allyl alcohol/gram of wax to produce a hydroxyl wax having a hydroxyl value in the range 30 to 75 mg KOH/g.

5. A process according to claim 3, wherein the grafting of the wax with the allyl alcohol is effected in the presence of a peroxide as a radical initiator.

6. A process according to claim 3, wherein the alkoxylation comprises reacting the hydroxyl wax with ethylene oxide to form a polyethoxy modified wax having a hydrophilic-lipophilic balance value between 2 and 18.

7. A process according to claim 2, wherein the oxidation of the wax and the hydrogenation of the oxidized wax is used to obtain the hydroxyl wax, with the oxidized wax having oxygen-containing primary and secondary functional groups, and with the hydroxyl wax having a hydroxyl value in the range of 30 to 150 mg KOH/g, and having primary and secondary hydroxyl groups.

8. A process according to claim 7, wherein the hydrogenating of the oxidized wax is effected by means of hydrogen in the presence of a catalyst, said catalyst selected from the group consisting of CuCr, Ru/C, and mixtures thereof, at an elevated temperature in the range from 100° C. to 300° C. and at an elevated pressure in the range from 50 bar to 300 bar.

9. A process according to claim 8, wherein the hydrogeration is effected in the presence of methanol as an esterification/transesterification agent.

10. A process according to claim 7 wherein the oxidized wax is esterified with methanol in the presence of p-toluene sulphonic acid as a catalyst prior to the hydrogenation of the oxidized wax, with the esterification being effected at a temperature in the range 100° C. to 200° C., and at a pressure in the range of 0,5 to 3 bar.

11. A process according to claim 7, wherein the primary and secondary hydroxyl groups on the hydroxyl wax are ethoxylated to obtain the modified wax.

12. A process according to claim 11, wherein the primary and secondary hydroxyl groups are ethoxylated in a batch reactor, in the presence of sodium ethoxide as a catalyst, at a temperature between 100° C. and 200° C., and at a pressure between 3 bar and 6 bar.

13. A process according to claim 2, wherein reaction of the wax with the peroxide is used to obtain the hydroxyl wax, with the wax being a Fischer-Tropsch derived hard wax, or light or heavy fraction thereof.

14. A process according to claim 13, wherein the peroxide is hydrogen peroxide, with the reaction being effected (i) at a temperature between 100° C. and 300° C.; and (ii) for a period between 15 and 200 minutes, with the reaction time depending on the reaction temperature, and with the hydroxyl wax having a hydroxyl value of between 15 and 400 mg KOH/g.

15. A process according to claim 13, wherein, during the alkoxylation step, the hydroxyl wax is ethoxylated, to obtain the modified wax.

16. A process according to claim 15, wherein the hydroxyl wax is subjected to propylene oxide treatment prior to ethoxylation.

17. A process for modifying a wax comprising hydrogenating an oxidized wax to form primary and/or secondary hydroxyl groups thereon, thereby to obtain a hydroxyl wax; and subjecting at least some of the hydroxyl groups of the hydroxyl wax to alkoxylation, thereby to form a modified wax.

18. A process for modifying a wax comprising treating a wax to introduce a hydroxyl functionality, said treating being selected from the group consisting of grafting a heavy fraction of a Fischer-Tropsch derived hard wax with allyl alcohol to form primary and/or secondary hydroxyl groups thereon to obtain a hydroxyl wax comprising a wax with side chains carrying a propanol group, hydrogenating an oxidized Fischer-Tropsch derived wax having oxygen-containing primary and secondary functional groups to form primary and secondary hydroxyl groups thereon to obtain a hydroxyl wax which has a hydroxyl value in the range of 30 to 150 KOH/g, reacting a Fischer-Tropsch derived hard wax, or a light or heavy fraction thereof, with a peroxide, to form primary and/or secondary hydroxyl groups thereon to obtain a hydroxyl wax, and mixtures thereof; and subjecting at least some of the hydroxyl groups of the hydroxyl wax to alkoxylation to form a modified wax.

* * * * *